D. A. Clary,
Governor.

Nº 46,778.  Patented Mar. 14, 1865.

Witnesses:
Wm. Geo. Harold
Chas. H. Smith

Inventor:
David A. Clary

UNITED STATES PATENT OFFICE.

DAVID A. CLARY, OF PITTSFIELD, MASSACHUSETTS.

IMPROVEMENT IN GOVERNORS.

Specification forming part of Letters Patent No. 46,778, dated March 14, 1865.

*To all whom it may concern:*

Be it known that I, DAVID A. CLARY, of Pittsfield, in the county of Berkshire and State of Massachusetts, have invented, made, and applied to use a certain new and useful Improvement in Regulators for Engines, Water-Wheels, &c.; and I do hereby declare the following to be a full, clear, and exact description of the said invention, reference being had to the annexed drawings, making part of this specification, wherein—

Figure 1:
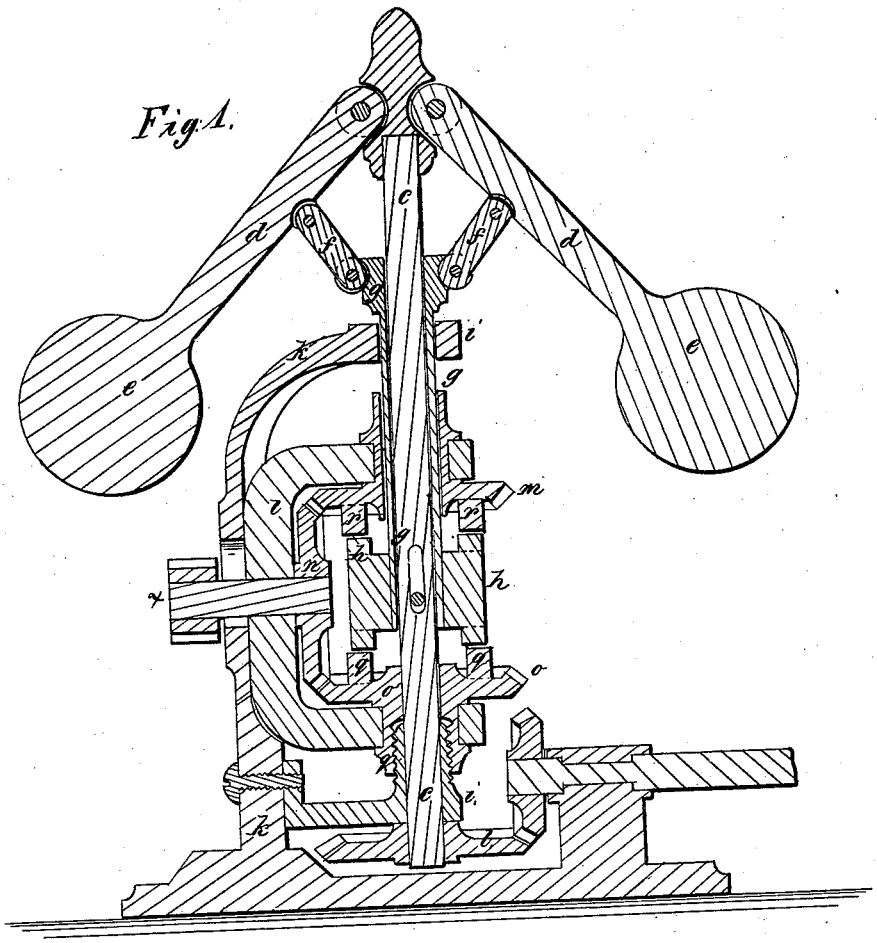
Figure 2:
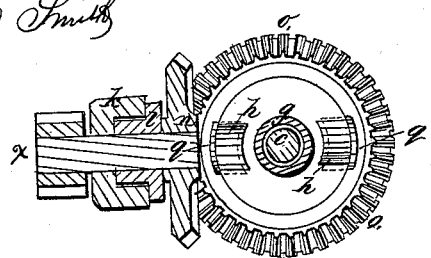

Figure 1 is a vertical section of my improved regulator, and Fig. 2 is a plan of the revolving clutches and miter-gears.

Similar marks of reference denote the same parts.

Governors for engines have heretofore been made with a clutch revolved by the shaft carrying the balls, and placed between two clutches—one above and the other below—connected with gear-wheels that are fitted to operate upon the throttle-valve, cut-off, or other device for controlling the admission of steam or other motive power to the given engine. A regulator of this character has to be set so as to run with a given speed, and when running at that speed the clutches above and below the main revolving clutch are unacted on; but if the speed is varied from any cause, the balls, falling or rising, make the clutch take and rotate the gear-wheel above or below, which either opens or closes the inlet for steam, &c., and continues this opening or closing movement until a change is effected in the speed of the engine, producing a reverse action by the opposite clutch. Thus the speed increases and then decreases several times before the normal speed of the engine is attained.

The object of my invention is to place the valve, cut-off, or analogous device in a given position, according to the speed of the governor-balls, and not move said valve or cut-off in the opposite direction until a change takes place in the speed of the motor. Thereby, if machinery should be thrown into gear with the engine or motor, the valve will be opened to increase the power, and so maintained until any variation in the power employed changes the speed of the governor, and that effects an adjustment of the valve, and there it remains until the next change of speed, so that great uniformity of power and speed is attained, and there is not an oscillation or vibration of the valve or parts acting upon the same every change of speed, as heretofore usual.

I effect the objects before explained by a sliding yoke carrying the miter-gears and clutches, by which the motion is communicated to the valve or gate, combined with the revolving clutch that is actuated from the governor, so that as said revolving clutch moves endwise the said gear-wheels and the clutches also move in the same direction simultaneously with the adjustment of the throttle or other valve or gate, and this movement of the clutches and gears endwise effects such a disconnection that the revolving clutch still continues to move, but does not act upon the other clutches until another end movement takes place.

In the drawings, *a* represents a miter-wheel, revolved by the engine or motor that is to be regulated.

*b* is a wheel driven by *a*, and rotating the shaft *c*, that carries the arms *d* and balls *e e*.

*f f* are links to the sleeve *g*, carrying the revolving clutch *h*.

*k* is a standard with boxes *i i*, supporting the shaft *c* and sleeve *g*.

*l* is a yoke carrying the miter-gears *m*, *n*, and *o*. The gear *n* is on a short shaft passing through the yoke *l* and through a slot in *k*, terminating with a pinion, *x*, acting upon a wheel with a shaft to a throttle-valve, or upon a slide or lever or any other device by which the motion given to the wheel *n* can be made operative in adjusting the position of a cut-off, gate, valve, or other device for regulating the motor. The wheels *m* and *o* have hubs and necks setting into the boxes at the ends of the yoke *l*, so as to move with said yoke, and the wheel *o* is fitted with a screw-thread at *s* to take the stationary screw *p* on the journal-box *i* from *k*.

*q* is a clutch on *o*, and *r* is a clutch on *m*. These are of such a length that the clutch *h* can revolve freely between them; but if said clutch *h* is moved endwise by the governor it will rotate either the clutch *q* and wheel *o*, moving the wheel *n* in one direction, or it will rotate the clutch *r* and wheel *m*, moving the wheel *n* in the other direction, and effecting the adjustment of the cut-off or its equivalent, and in consequence of the rotation of the wheel *o* the screw thereon will move the yoke *l* one way or the other, and place the clutches $q$ and $r$ so that they will cease to be operative in moving the miter-wheels, and the clutch $h$ will continue its rotation, but cease to move the other clutches until another change takes place in the speed.

In place of the screw $p$, a section of a screw may be employed; or an inclined groove and stationary point, to give end motion to the gears and yoke, and any desired character of clutch or friction plates may be used instead of those shown.

This apparatus for regulating the speed of machinery may be applied to looms or any mechanism requiring great uniformity of power, in which case a connection from the pinion $x$ will be required to move a belt on a pair of cone-pulleys, so as to maintain a uniform speed of the machine propelled, regardless of variations in the speed of the motor.

It will also be evident that any character of governor adapted to the purpose may be employed, connected in any suitable way, with the revolving clutch $h$.

What I claim, and desire to secure by Letters Patent, is—

1. Communicating to the clutches acted upon by a revolving clutch a movement endwise, substantially as specified, so that said clutches will separate from the revolving clutch so soon as an adjustment of the cut-off, valve, or other regulating mechanism has been effected, as specified.

2. The gears $m$ $n$ $o$ and clutches $h$ $q$ $r$, in combination with a yoke, $l$, moving endwise, in substantially the manner and for the purposes set forth.

3. Communicating to the yoke $l$ an endwise movement by means of the nut and screw, actuated substantially as specified.

In witness whereof I have hereunto set my signature this 11th day of January, 1865.

DAVID A. CLARY.

Witnesses:
LEMUEL W. SERRELL,
CHAS. H. SMITH.